Oct. 20, 1953

C. H. SCHLESMAN 2,656,468

ATTENUATOR FOR RECORDING SYSTEMS

Filed July 20, 1948

INVENTOR
CARLETON H. SCHLESMAN
BY
James Y. Cleveland.
ATTORNEY

Oct. 20, 1953    C. H. SCHLESMAN    2,656,468
ATTENUATOR FOR RECORDING SYSTEMS
Filed July 20, 1948    3 Sheets-Sheet 2
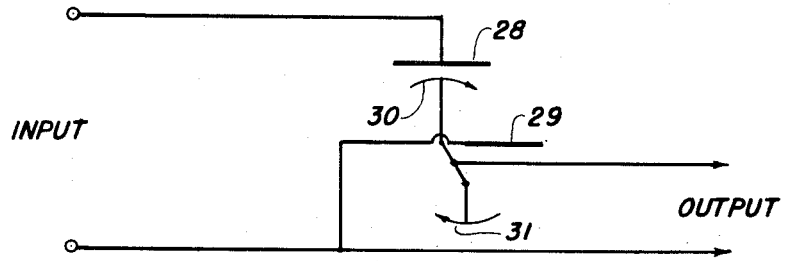
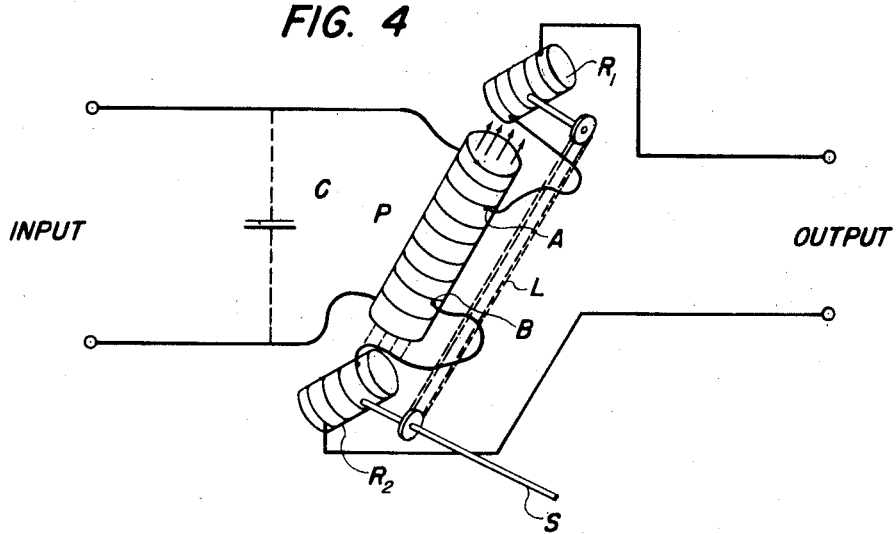
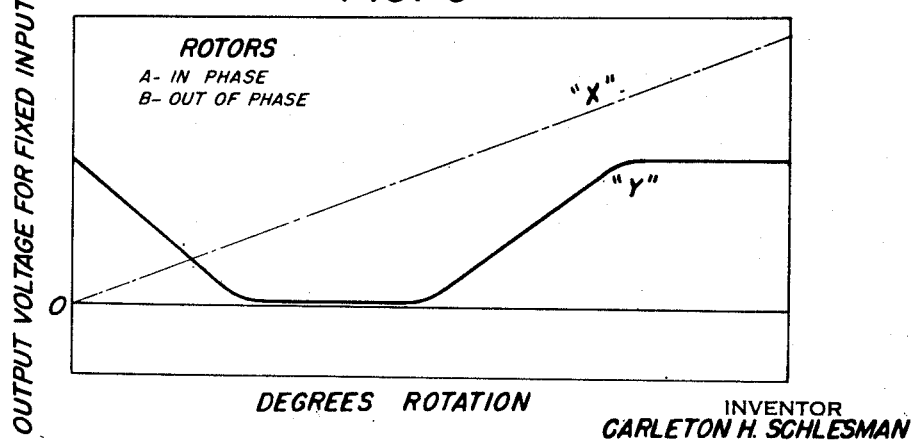
INVENTOR
CARLETON H. SCHLESMAN
BY
ATTORNEY Oct. 20, 1953 — C. H. SCHLESMAN — 2,656,468
ATTENUATOR FOR RECORDING SYSTEMS
Filed July 20, 1948

DEGREES ROTATION OF CONDENSER

INVENTOR
CARLETON H. SCHLESMAN

Patented Oct. 20, 1953

2,656,468

UNITED STATES PATENT OFFICE 2,656,468

ATTENUATOR FOR RECORDING SYSTEMS

Carleton H. Schlesman, Washington, D. C., assignor to Socony-Vacuum Oil Company, Incorporated, a corporation of New York Application July 20, 1948, Serial No. 39,766

2 Claims. (Cl. 250—43.5)

This invention relates generally to recording systems and more particularly to electronic equipment whose basic design has heretofore not permitted the achievement of straight line calibration.

In the development of various types of electronic equipment, such as, for example, the infra-red recording spectrograph, it is common practice to record percentage of transmission of infra-red radiation versus wave length or frequency of the radiation. In general the basic design of these instruments does not permit them to achieve straight line calibration over a wide band of wave lengths or frequencies since the radiation energy, of the source in the case of infra-red instruments, varies rapidly with wave length. In like manner it is often desirable to make correction of systematic errors which arise from non-linearity of circuit elements or through other causes. A great variety of devices has been utilized to accomplish such corrections, of which mechanical cams are the best known examples. However, even in instruments employing such mechanical compensation the correction is not complete so that an additional adjustable compensator or corrector would often be of considerable value.

The present invention deals with a novel method of surmounting these difficulties. Briefly the invention consists of the use of a carrier current for two functions, first, the transmission of the information to be recorded or indicated and, second, for the correction of the output to the required form. Details of a system in which the carrier current performs the first function are disclosed in a copending application of Frank G. Brockman, Serial No. 537,652, now Patent #2,516,672. Referring generally to the detailed disclosure of the Brockman application, electrical energy is supplied from an oscillator at a frequency of, for example, 1000 cycles per second. This electrical energy is modulated by an element which is sensitive to variations in the property to be recorded, for example, variations in infra-red energy transmitted through the sample. The modulated signal is amplified by a critically tuned inverse feed-back amplifier from which it passes to a rectifier and recorder. The second function of the carrier is to enable the output of the amplifier to be corrected to the required form. Since the signal representing detected transmitted infra-red radiation varies in strength at 100% transmission with wavelength in accordance with an exponential curve, it is apparent that straight line calibration cannot be achieved.

The present invention surmounts these difficulties by utilizing a corrector network to which the signal from the critically tuned amplifier is fed before it is rectified and recorded. This network may comprise reactive, capacitive, or other circuit elements which vary the output in synchronization with the instrument scanning, for example, by wave length or frequency.

Therefore a primary object of the present invention resides in the provision of corrected networks to recording systems which otherwise could not achieve straight line calibration.

Another object of this invention resides in the provision of an electrical network which will correct for non-linearity of signals that it is desired to record.

Still another object of this invention resides in the provision of electronic means which may be interposed ahead of a recording instrument whereby straight line calibration may be achieved.

This invention also contemplates the provision of inductive, capacitive or other circuit elements which will vary the signals derived from a source in accordance with some predetermined schedule.

Other objects and advantages of the present invention will become apparent from the following detailed description when considered with the drawings in which, Figure 1 is a schematic diagram illustrating the present invention applied to an infra-red spectrometer;

Figure 3 is an electrical circuit diagram illustrating the relationship between two variable condensers when used as an attenuator;

Figure 4 is a schematic diagram showing the use of a variable transformer in effecting attenuation in accordance with the present invention;

Figure 5 shows two curves which represent voltage output for a fixed input plotted against degrees of rotation of the moving elements of the variable transformers shown in Figure 4;

Although the present invention has broad application it will be described as applied to an infra-red spectrometer.

Figure 1:
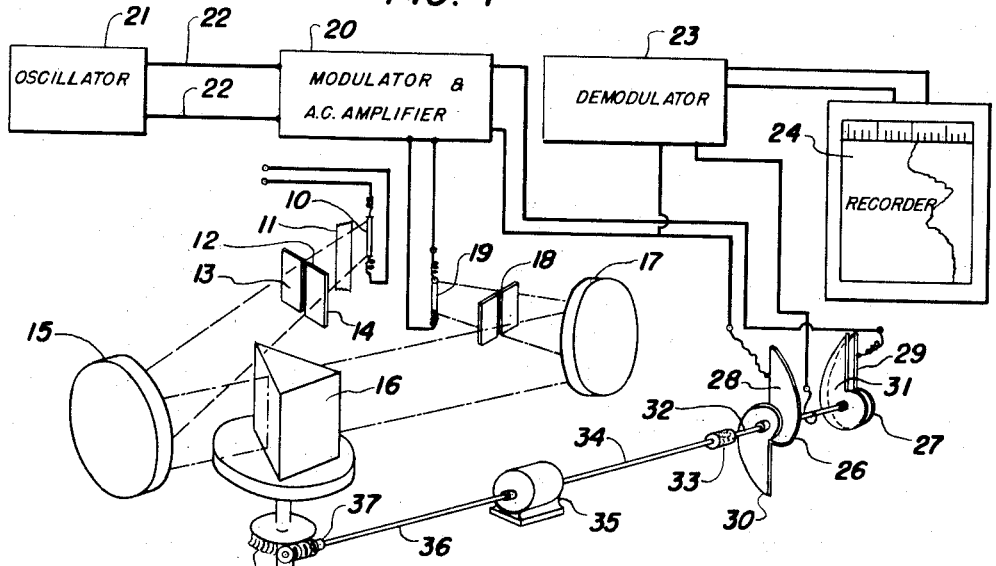

Referring to the drawings in detail, particularly Figure 1, there is shown schematically an infra-red spectrometer which comprises a source of infra-red radiation 10 which may be a Globar, Nernst lamp, or black body. The radiation given off by the source 10 may be caused to impinge on a cell 11 containing a substance that it is desired to analyze. The cell 11 in the manner well known in the art may be made up of rock salt plates that will transmit infra-red radiation. The radiation transmitted through the sample contained in the cell 11 falls upon a slit 12 between elements 13 and 14. Movement of the elements 13 and 14 can be made to vary the width of slit 12 to regulate the amount of radiation transmitted through the slit. The radiation passing through the slit 12 strikes the reflecting surface 15 from which it is reflected to the face of a prism 16. The dispersed radiation from the prism 16 falls upon a second reflecting surface 17 which reflects the radiation through a slit 18 on to a detector 19.

Detector 19 is an element of the modulator 20. Modulator 20 is supplied with a carrier wave which is produced by the oscillator 21 by means of conductor 22. The energy detected by detector 19 serves to modulate the carrier wave in the modulator 20 in a manner well known in the art. Such modulation can be effected by making the detector 19 one element of a bridge circuit across which is impressed the carrier wave. The output of the bridge circuit will be a signal having the frequency of the carrier wave and modulated in amplitude in accordance with the detected radiation. Modulator 20 may include a highly tuned alternating current amplifier which will amplify the modulated signal before it is passed on to a demodulator and recorder. The output from the unit 20, which as stated may contain the modulator and an alternating current amplifier, normally would be fed directly into the demodulator 23 and the signal output therefrom would be impressed upon the recorder 24 which would make a record of percent of radiation transmitted through the sample 11 against frequency or wave length of the radiation. Such a record is made possible by synchronizing the recorder with rotating mechanism which drives the shaft 25 to rotate the prism 16 through an angle sufficiently great that all of the dispersed radiation therefrom will scan the reflecting surface 17 and as a consequence the detector 19. Details of a system similar to that described thus far are shown in the copending application of Frank G. Brockman, Serial Number 537,652.

As is well known in the art, the intensity of radiation given off by the source 10 varies gently with its wave length. Although all of the wave lengths of the radiation over a given range of frequencies are given off constantly the prism serves to disperse the radiation and pass to the detector the different wave lengths in an orderly fashion.

Figure 2:
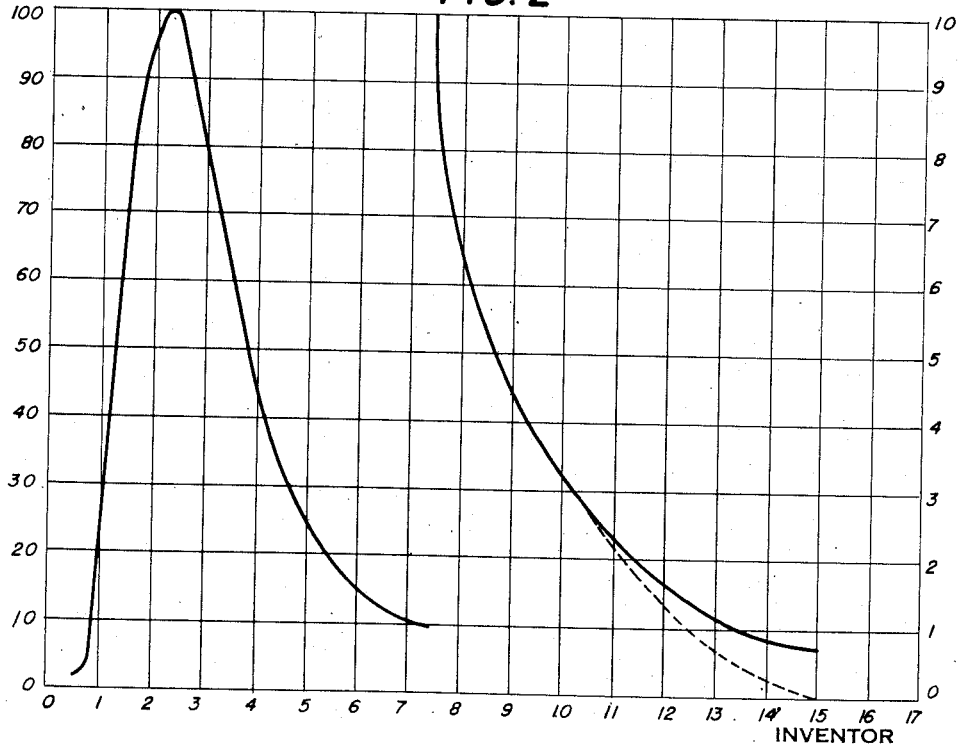
Figure 2 is a curve which has been plotted with percent of radiation transmitted as ordinates against wave length as abscissa.

Figure 2 shows a curve which represents the variation in intensity of radiation given off by an infra-red radiation source with wave length. It will be noted that as the wave length decreases from about 14 microns to zero the intensity increases exponentially to a peak at approximately 2¼ microns at which point it begins to fall off rapidly. The curve represents the radiation obtained from a Globar when operated at 1400° K.

Attempts have been made to mechanically vary the width of the slit 12 in order to control the transmitted radiation and achieve straight line calibration of the system. This has advantages over the method of recording in which a part of the spectrum is recorded, the system is then shut down and an adjustment made of the slit 12, then another portion of the spectrum recorded, and so on until the entire useful portion of the spectrum has been recorded. Automatic mechanical variation of the slit 12 has been tried but has not proven to be entirely successful.

The present invention has overcome the difficulties encountered by those working in the prior art by providing a variable attenuator which acts directly upon the modulated carrier wave before it is demodulated and recorded. The attenuator takes the form of two automatically variable condensers 26 and 27. Condensers 26 and 27 comprise the fixed plates 28 and 29 respectively, and rotor plates 30 and 31 respectively. The rotor plates fixedly engage a shaft 32 and are adapted to be rotated thereby. Shaft 32 is driven through an insulating coupling 33 by the shaft 34 and the synchronized motor 35. It is obvious that gears may be interposed in the shaft 34 to vary the speed of rotation of the rotor plates 30 and 31. Shaft 36, also driven by the motor 35, is adapted to drive the shaft 25 through means of the worm gear 37 and the spur gear 38.

Condensers 26 and 27 are electrically connected in the system between the modulator and amplifier 20 and the demodulator 23. This connection is shown in Figures 1 and 3. It will be noted that the rotor and stator of each condenser are arranged in such a manner that they operate 180 degrees out of phase.

In operation the carrier wave having a frequency of, for example, 1000 cycles may be employed and modulated by the detected infra-red energy. The modulated signal may then be amplified by the conventional highly tuned alternating current amplifier. Since this signal varies in strength at 100% transmission with frequency, it is next fed to the corrector network which comprises the condensers 30 and 31. The condensers 30 and 31 vary the output of the amplifier in synchronization with the instrument scanning, for example, in accordance with the wave length. The corrected output is then demodulated by the element 23 and fed to the recorder or indicator 24.

Without a corrector the recorder, if set to indicate full scale with 100% transmission at a wave length of 15 microns, would immediately pass off the scale as the wave length is reduced and at a wave length of 10 microns would be attempting to record a value approximately 330% of full recorder scale. When using the corrector and starting it simultaneously with the starting of the scanning of the spectrum, as the energy content of the source increases, as a result of lowering in wave length, the attenuation properties of the corrector are likewise increased so that in the absence of a sample the recorder will draw a line indicating 100% transmission.

It will be appreciated that in instruments intended for various purposes the correction necessary to secure the desirable output will vary. In some instances peaks will appear in the curve. This contingency has been provided for by designing the plates of the capacitors 26 and 27 so that the attenuation is always that required to achieve the desired output. Further adjustment of the plates of capacitors 26 and 27 may be effected by filing the edges locally, by bending portions of the rotor plates so that they are closer to the stator, or by employing a multiplicity of plates of various sizes.

In instruments employing low carrier frequencies it may be found advantageous to employ rotary transformers as corrector elements. Figure 5 illustrates one such device. In this form of the invention the coil P of the transformer is maintained stationary and rotors $R_1$ and $R_2$ are adapted to be rotated with respect to the stationary coil P. The coils $R_1$ and $R_2$ may be connected by linkage L so that they can be driven by a single shaft S which may correspond to shaft 32 in Figure 1. It is to be understood that they can be driven either in phase or out of phase by any desired degree. The voltage generated in $R_1$ and $R_2$ varies with their positions with respect to the field of coil P. Taps A and B supply a bucking voltage such that the voltage induced in a coil such as $R_1$ is just cancelled at one extreme of rotation and is doubled at the other extreme (180° rotation). This corrector will yield approximately the characteristics shown by the curve marked X in Figure 5. Changes in design or shifting of the phase of the coils $R_1$ and $R_2$ will yield other curves such as, for example, that shown in Figure 5 at Y.

A condenser C may be added to the circuit, as shown in Figure 4, so that the circuit may be tuned to resonance at the carrier frequency to discriminate against other frequencies.

Figure 6:
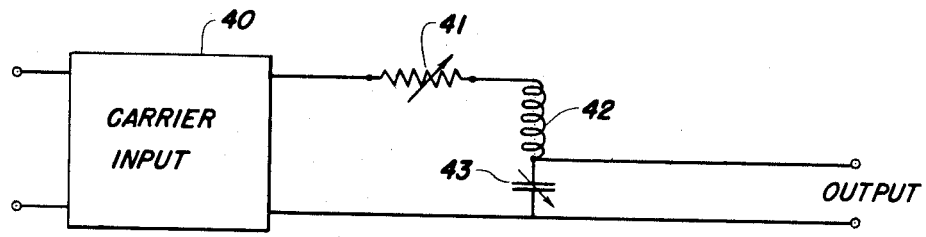
Figure 6 is a schematic wiring diagram showing a further modification of the instant invention.

In Figure 6 there is illustrated still another form of the present invention. In this form of the invention a combination of circuit elements are used including both capacity and inductance. A signal fed into the carrier input 40 is impressed across the impedance elements which consist of variable resistance 41, inductance 42 and variable condenser 43. The output signal is taken from the circuit by conductors 44 which are connected across the variable condenser 43.

Figure 7:
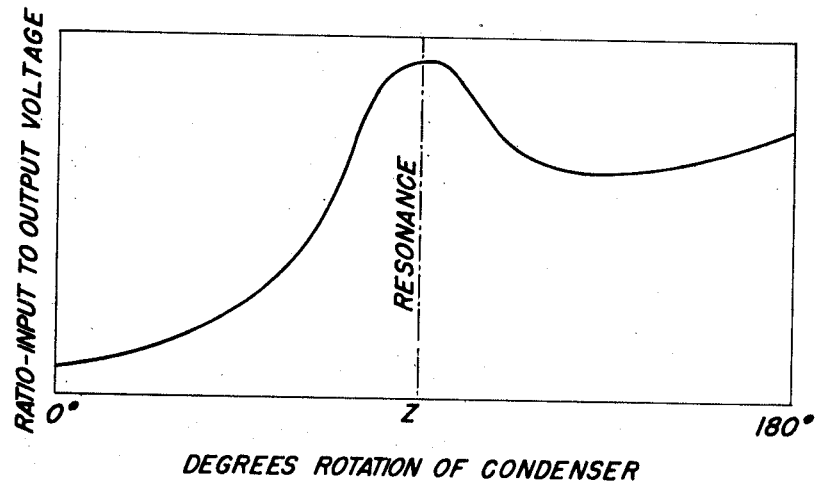
Figure 7 is a curve which has been plotted with ratio-input to output voltage against degrees of rotation of the condenser shown in Figure 6.

The characteristic of this form of corrector is shown in Figure 7. This curve has been plotted with ratios of input to output voltages as ordinates and degrees rotation of condenser 43 as abscissa.

It is to be understood that this corrector circuit may be connected into the circuit of Figure 1 in the same manner as the other forms of the present invention, described above, and that the variable condenser 43 can be mounted and driven in the same manner as one of the condensers 26 or 27.

It will be appreciated that the output voltage will increase with respect to the input voltage as the capacity of condenser 43 decreases. If, at a point, such as Z on the characteristic curve, the circuit constants are selected such that resonance occurs, a peak in the output curve will occur. The shape of this peak may be altered by varying the resistance 41.

The present invention presents a practical solution to a very difficult problem. The advantage of combining correction means with the use of a carrier current that permits the recording of phenomena which change very slowly with time is particularly great. Furthermore, the equipment is compact and the preferred circuit elements do not consume power as is the case with resistance attenuators which are also objectionable because of their sliding contacts. For this reason this equipment is particularly valuable in portable instruments.

I claim:

1. An infrared spectrometer that comprises a source of infrared radiation, a detector of infrared radiation adapted to produce electrical signals proportionally related to radiation from said source impinging thereon, a cell containing a specimen interposed in the path of the radiation between the source and detector, means for dispersing the radiation transmitted by the specimen in accordance with wave length thereof, means for scanning the detector with said dispersed radiation, an oscillator for producing electrical oscillations that are alternating in character, modulating means responsive to the detection signals for altering a characteristic of said oscillations, an alternating current amplifier for amplifying the altered oscillations, an attenuator connected in the output circuit of said amplifier for attenuating the amplified altered oscillations that have average amplitudes above a predetermined value by a predetermined amount, said attenuator comprising an electrical impedance, means coordinated with said scanning means for varying said impedance in direct proportion to the change in energy of the envelope with wave length of the radiation given off by the source and transmitted by said specimen, and a recorder for recording the resultant signals.

2. An infrared spectrometer that comprises a source of infrared radiation, a detector of infrared radiation adapted to produce electrical signals proportionally related to radiation from said source impinging thereon, a cell containing a specimen interposed in the path of the radiation between the source and detector, means for dispersing the radiation transmitted by the specimen in accordance with wave length thereof, means for scanning the detector with said dispersed radiation, an oscillator for producing electrical oscillations that are alternating in character, modulating means responsive to the detection signals for altering a characteristic of said oscillations, an alternating current amplifier for amplifying the altered oscillations, an attenuator connected in the output circuit of said amplifier for attenuating the amplifier altered oscillations that have average amplitudes above a predetermined value by a predetermined amount, said attenuator comprising an electrical impedance, means coordinated with said scanning means for varying said impedance in direct proportion to the change in energy of the envelope with wave length of the radiation given off by the source and transmitted by said specimen, a demodulator connected to the attenuator for demodulating the output signals from said attenuator, and a recorder for recording the resultant signals.

CARLETON H. SCHLESMAN.

References Cited in the file of this patent

UNITED STATES PATENTS

| Number | Name | Date |
| --- | --- | --- |
| 1,784,522 | Harrison | Dec. 9, 1930 |
| 2,203,750 | Sherman | June 11, 1940 |
| 2,313,666 | Peterson | Mar. 9, 1943 |
| 2,378,925 | Hoskins et al. | June 26, 1945 |
| 2,451,572 | Moore | Oct. 19, 1948 |
| 2,476,005 | Thomas | July 12, 1949 |
| 2,525,445 | Canada | Oct. 10, 1950 |
| 2,573,870 | Pfund | Nov. 6, 1951 |